United States Patent [19]

Hayashi

[11] Patent Number: 4,770,918

[45] Date of Patent: Sep. 13, 1988

[54] DIAPHRAGM FOR PRODUCING SOUND

[76] Inventor: Akira Hayashi, 36-8, Higashinakano 2-chome, Nakano-ku, Tokyo, Japan

[21] Appl. No.: 96,549

[22] Filed: Sep. 14, 1987

[30] Foreign Application Priority Data

Oct. 17, 1986 [JP] Japan .................. 61-246961

[51] Int. Cl.$^4$ ............................................... B32B 5/12
[52] U.S. Cl. ..................... 428/113; 428/246; 428/251; 428/252; 428/259
[58] Field of Search ............... 428/113, 246, 251, 252, 428/259

[56] References Cited

U.S. PATENT DOCUMENTS

| | | | |
|---|---|---|---|
| 1,903,960 | 4/1933 | Dreyfus | 428/259 |
| 2,477,407 | 7/1949 | Grant | 428/259 |
| 4,282,011 | 8/1981 | Terpay | 428/259 |

Primary Examiner—Marion C. McCamish
Attorney, Agent, or Firm—Scully, Scott, Murphy & Presser

[57] ABSTRACT

A diaphragm for producing sound includes a laminated structure having at least one layer of a first fabric and at least two layers of second fabrics. The first fabric is woven from filament yarns including at least partly chemical fiber yarns of a low elongation. Each of the second fabrics is woven from filament yarns made of a chemical fiber of a high elongation. The layer of the first fabric and the layers of the second fabrics are disposed in such a manner that warps of the first fabric and warps of the second fabric cross each other at an angle of 10° to 80°, whereby an elongation of the diaphragm in a direction of the warps of the first fabric is generally equal to an elongation of the diaphragm in a direction inclined at an angle of 45° relative to the direction of the warps of the first fabric.

10 Claims, 2 Drawing Sheets

DIAPHRAGM FOR PRODUCING SOUND

BACKGROUND OF THE INVENTION

1. Field of the Invention

The present invention relates to a diaphragm for use in sound producing devices such as drums.

2. Prior Art

Conventionally, diaphragms for drum heads have been produced by animal skins or synthetic resin films. However, inasmuch as the supply of animal skins which have a desired musical quality may not be sufficient to meet the demands of the industry, the price of the skins may be quite high. In addition, the diaphragms made of animal skins have the disadvantage that the tones produced by such diaphragms are not of great compass. Furthermore, animal skins are liable to be affected by surrounding conditions such as temperature and humidity. This causes the musical sounds produced by the animal type drum skins to vary in quality. In contrast, the synthetic resin films may hardly be affected by surrounding conditions, and therefore the diaphragms made of synthetic resin films are advantageous in that a stable frequency characteristic is easily obtained. The synthetic resin films used for the drum heads, however, still involve the disadvantage that the tones produced by such diaphragms are not of sufficiently great compass. Further, in order to obtain a tone of specific kind, a suitable material has to be chosen since each of the animal skin and the synthetic film individually produces a tone inherent in the material. However, the kinds of the materials available have been limited, and hence it has been difficult to obtain such a diaphragm as to produce a tone of a desired kind.

Consequently, the inventor previously provided various diaphragms each comprising a fabric woven from a chemical fiber or a plurality of such woven fabrics to overcome the above-mentioned disadvantages. Such woven fabric type diaphragm, however, has another disadvantage that when used for a drum head, it is difficult to tune the diaphragm to obtain a generally uniform tone over the entire percussive surface thereof.

SUMMARY OF THE INVENTION

It is therefore an object of the present invention to provide a diaphragm for producing sound which can produce a tone of a desired kind having not only stable quality but also great compass, and which can be easily tuned in any direction to enable a generally uniform tone to be produced over the entire percussive surface thereof.

According to the present invention, there is provided a diaphragm for producing sound, comprising a laminated structure composed of at least one layer of a first fabric and at least two layers of second fabrics, the first fabric being woven from filament yarns including at least partly chemical fiber yarns of a low elongation, each of the second fabrics being woven from filament yarns made of a chemical fiber of a high elongation, the layer of the first fabric and the layers of the second fabrics being disposed in such a manner that warps of the first fabric and warps of the second fabric cross each other at an angle of 10° to 80°, whereby an elongation of the diaphragm in a direction of the warps of the first fabric is generally equal to an elongation of the diaphragm in a direction inclined at an angle of 45° relative to the direction of the warps of the first fabric.

DESCRIPTION OF THE PREFERRED EMBODIMENTS OF THE INVENTION

Figure 1:
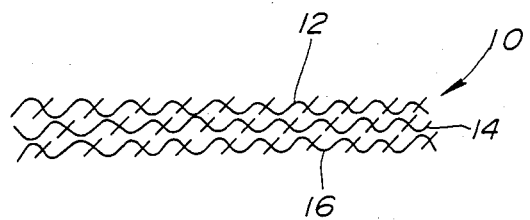
FIG. 1 is a vertical cross-sectional view of a diaphragm in accordance with one embodiment of the present invention.
Figure 2:
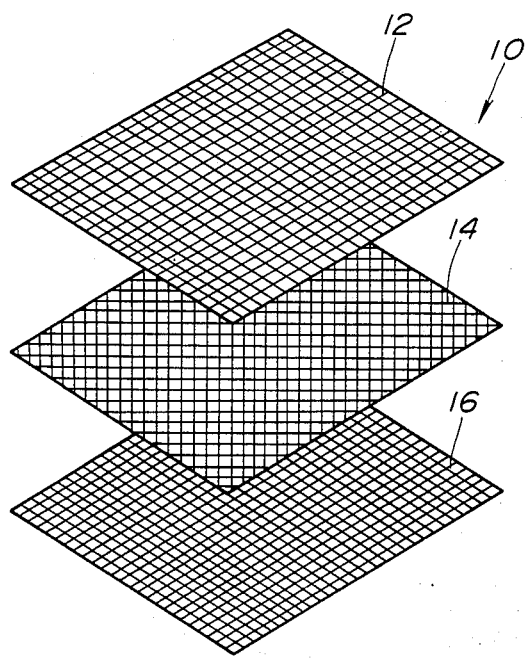
FIG. 2 is a perspective view of woven fabrics used for the diaphragm in FIG. 1, showing a laminated structure of the diaphragm.

Referring to FIGS. 1 and 2, a diaphragm for producing sound in accordance with one embodiment of the present invention, generally designated at 10, is composed of a laminated structure including top, intermediate and bottom layers 12, 14 and 16 of fabrics. Each of the top and bottom layers 12 and 16 is composed of a fabric woven from filaments of a synthetic fiber having high elongation. A preferred synthetic fiber is a polyester fiber having the elongation of 14 to 17%. However, other synthetic fibers such as a polyvinylidene chloride fiber, a nylon fiber, a vinylon fiber and an acrylic fiber may also be successfully used. The woven fabric of the top layer 12 may preferably be a plain weave having a density of 40 wefts×40 warps, for example. And, the yarns used for weaving the synthetic fiber fabric should preferably be multifilaments of a size not larger than 400 deniers. For example, multifilaments each composed of 48 monofilaments and having a size of 75 to 200 deniers can preferably be used.

The intermediate layer 14 is composed of a fabric woven from filament yarns of a chemical fiber of low elongation. A particularly preferred chemical fiber of low elongation is a polyaramide fiber produced for example by E.I. duPont de Nemours & Co., Inc., under the registered trade mark KEVLAR, the elongation of the polyaramide fiber being about 2.4%. However, other chemical fibers such as a carbon fiber, a glass fiber and a silicon carbide fiber may also be used. The yarns of such a chemical fiber should preferably be multifilaments, and the preferable size thereof depends on the thickness of the layer. For example, multifilaments each composed of 134 monofilaments and having a size of 195 deniers can be successfully used. The woven fabric of the intermediate layer 14 may also be a plain weave having the same density as the fabrics of the top and bottom layers.

Further, the top and bottom layers 12 and 16 of the fabrics are disposed so that the yarns of the respective layers are arranged in overlapping relation, and the intermediate layer 14 is laminated between the top and bottom layers 12 and 16 so that the warps of the intermediate layer 14 cross the warps of the top and bottom layers 12 and 16 at an angle of 45°.

For laminating chemical fiber cloth layers to each other, an adhesive may be applied to surfaces to be bonded of each material, which is then superposed in a predetermined order. Thereafter, the superposed layers are subjected to a uniform thicknesswise pressure to thereby unite them together. Adhesives of ethylene-vinyl acetate copolymer, polyamide resin, polyester resin, epoxy resin and the like may be used for bonding the layers. When bonded with such adhesive, the superposed layers are subjected to a pressure of about 5 to about 100 Kg/cm² under heat at a temperature of about 40° C. to about 140° C.

The diaphragm 10 as mentioned above can produce tones having stable quality and great compass since it is composed of woven fabrics of chemical fibers. In addition, since fabrics woven from different kinds of chemical fibers are laminated to each other, the diaphragm 10 can produce tones different from those produced by diaphragms having woven fabrics of the same kind. Accordingly, by employing various combinations of different chemical fibers, the diaphragms can produce various tones. Further, the intermediate layer 14 is disposed between the top and bottom layers 12 and 16 so that the warps of the intermediate layer 14 and the warps of the top and bottom layers 12 and 16 cross each other at an angle of 45°. With this construction, even if a portion of the percussive surface of the diaphragm is subjected to a tear, the yarns of the top and bottom layers and the yarns of the intermediate layer cooperate with each other to prevent the tear from further developing along the yarns of each layer, so that the diaphragm possesses excellent durability.

Further, since the diaphragm is comprised of a laminated structure consisting of one layer of the woven fabric of low elongation and two layers of the woven fabrics of high elongation, and the warps of the one layer and the warps of the two layers are disposed so as to cross each other at an angle of 45°, the elongation of the diaphragm in a direction of the warps of the the one layer is generally equal to the elongation of the diaphragm in a direction inclined at an angle of 45° relative to the direction of the warps of the one layer. Accordingly, when regulating tension of the diaphragm 10 in radial directions to tune a drum, the yarns of the woven fabrics of the diaphragm 10 are not caused to be biased in one direction to thereby facilitate the tuning, and therefore the diaphragm 10 is stretched so uniformly in all directions as to permit generally uniform tones to be produced over the entire percussive surface of the diaphragm. Thus, the diaphragm in accordance with the present invention can be particularly easily tuned, as compared with a conventional diaphragm.

Further, when the diaphragm described above is mounted on a drum head, the top layer 12 serves as the percussive surface, but the top layer 12 is composed of the fabric woven from a polyester fiber, which has a sufficiently high wear resistance. As a result, the percussive surface of the diaphragm is not subjected to wear, so that the diaphragm exhibits excellent durability for a prolonged period of time. To achieve such sufficient durability, a nylon fiber may also be successfully employed instead of the polyester fiber.

Although in the foregoing, the diaphragm is composed of three layers of woven fabrics, the number of the layers may be altered. However, at least one layer of the fabric woven from yarns of low elongation and at least two layers of the fabrics woven from yarns of high elongation are necessary to provide the diaphragm of the present invention. Further, the diaphragm in accordance with the present invention may further include one or more synthetic resin film layers. Such synthetic resin film may include for example a polyester film, a polyvinyl chloride film, a nylon film, a polystyrene resin film, an acrylic resin film and the like. The diaphragm may include a plurality of synthetic resin films of the same kind or different kinds. In addition, the resin film layer may be laminated to the top layer of the woven fabric, and/or to the bottom layer of the woven fabric, and may be included between the two layers of the woven fabrics.

Figure 3:
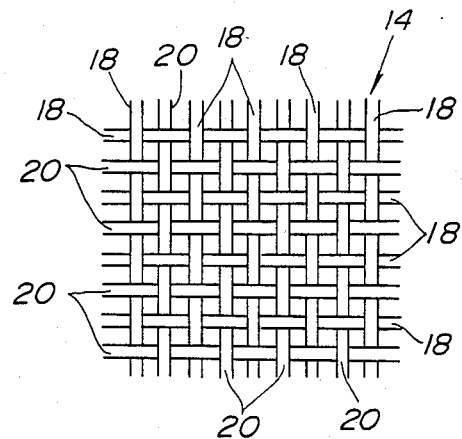
FIG. 3 is a schematic plan view of a modified woven fabric used as an intermediate layer for the diaphragm of FIG. 1.

Further, the intermediate layer 14 or another layer may be composed of a union fabric woven from warps of two kinds of chemical fibers and wefts of the same two kinds of chemical fibers, one kind of the chemical fiber having a low elongation while the other kind of the chemical fiber having a higher elongation. FIG. 3 shows an example of such a union fabric. In the diaphragm of this type, a new tone different from the tones inherently produced by the respective chemical fiber fabrics can be obtained from the union fabric.

Further, the intermediate layer 14 may be laminated between the top and bottom layers 12 and 16 so that the warps of the intermediate layer 14 and the warps of the top and bottom layers 12 and 16 cross each other at an angle of 30° or another specific angle. However, the angle should be in the range of 10° to 80°, preferably of 15° to 75°, because beyond this range, advantages as described supra can hardly be expected.

Figure 4:
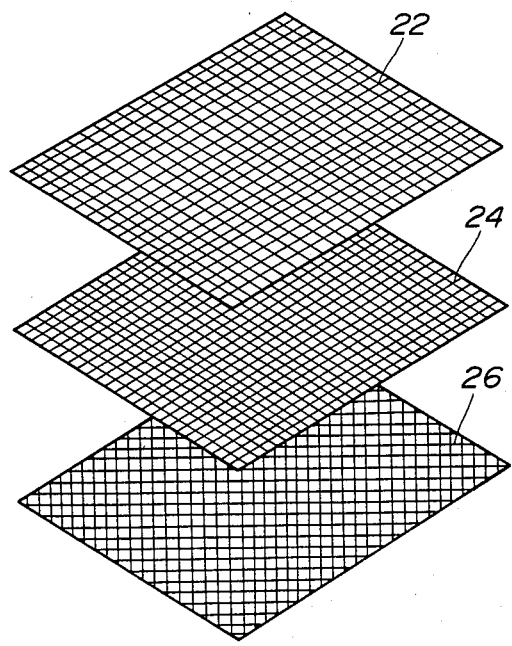
FIG. 4 is a perspective view of a modified diaphragm in accordance with the present invention.

FIG. 4 shows another modified diaphragm in accordance with the present invention which is composed of the top and intermediate layers each composed of the fabric woven from filament yarns made of a chemical fiber of high elongation such as a polyester fiber, and a bottom layer laminated to a lower face of the intermediate layer away from the top layer and composed of the fabric woven from filament yarns including chemical fiber yarns of low elongation such as polyaramide fiber yarns. In this embodiment, the top and intermediate layers are disposed so that the yarns of the respective fabrics are arranged in overlapping relation, and the bottom layer is disposed so that the warps of the fabric of the bottom layer cross the warps of the fabrics of the top and intermediate layers at a prescribed angle. However, the bottom layer may be disposed so that the warps of the fabric of the bottom layer cross the warps of the fabrics of the top and intermediate layers at the prescribed angle.

Obviously many modifications and variations of the present invention are possible in the light of the above teachings. It is therefore to be understood that within the scope of the appended claims, the invention may be practiced otherwise than as specifically described.

What is claimed is:

1. A diaphragm for producing sound, comprising a laminated structure composed of at least one layer of a first fabric and at least two layers of second fabrics, said first fabric being woven from filament yarns including at least partly chemical fiber yarns of a low elongation, each of said second fabrics being woven from filament yarns made of a chemical fiber of a high elongation, said layer of said first fabric and said layers of said second fabrics being disposed in such a manner that warps of said first fabric and warps of said second fabric cross each other at an angle of 10° to 80°, whereby an elongation of the diaphragm in a direction of the warps of the first fabric is generally equal to an elongation of the diaphragm in a direction inclined at an angle of 45° relative to said direction of the warps of the first fabric.

2. A diaphragm according to claim 1, in which said chemical fiber yarns of a low elongation being made of multifilaments of a chemical fiber selected from the group consisting of a polyaramide fiber, a glass fiber, a carbon fiber and a silicon carbide fiber, said chemical fiber yarns of a high elongation being made of multifilaments of a synthetic fiber selected from the group consisting of a polyester fiber, a polyvinylidene chloride fiber, a nylon fiber, a vinylon fiber, an acetate fiber, an acrylic fiber and a rayon fiber.

3. A diaphragm according to claim 2, comprising top and bottom layers each composed of said second fabric, and an intermediate layer interposed between said top and bottom layers and composed of said first fabric, the warps of said second fabric of said top layer crossing the warps of said first fabric of said intermediate layer at said angle while the warps of said second fabric of said bottom layer cross the warps of said first fabric of said intermediate layer at said angle.

4. A diaphragm according to claim 2, comprising top and intermediate layers each composed of said second fabric, and a bottom layer laminated to a lower face of said intermediate layer away from said top layer and composed of said first fabric, said top and intermediate layers of said second fabric being disposed in overlapping relation, said bottom layer of said first fabric being disposed so that the warps of said first fabric of said bottom layer cross the warps of said first fabrics of said top and intermediate layers at said angle.

5. A diaphragm according to claim 3 or claim 4, in which said second fabric of said top layer is woven from fiber yarns of high wear resistance.

6. A diaphragm according to claim 5, in which said fiber yarns of high wear resistance are selected from the group consisting of polyester fibers and nylon fibers.

7. A diaphragm according to claim 1 or claim 2, in which said first fabric is woven from said chemical fiber yarns of a low elongation.

8. A diaphragm according to claim 1 or claim 2, in which said first fabric is a union fabric woven from said chemical fiber yarns of a low elongation and said chemical fiber yarns of a high elongation.

9. A diaphragm according to claim 8, in which in said union fabric, said chemical fiber yarns of a low elongation and said chemical fiber yarns of a high elongation are arranged in a predetermined regular order in both warp and weft directions.

10. A diaphragm according to claim 9, in which in said union fabric, said chemical fiber yarns of a low elongation and said chemical fiber yarns of a high elongation are arranged in an alternate order in both warp and weft directions.

* * * * *